(12) United States Patent
Zhang et al.

(10) Patent No.: US 6,522,790 B1
(45) Date of Patent: Feb. 18, 2003

(54) METHOD AND APPARATUS FOR MERGING IMAGES

(75) Inventors: Xing Zhang, Menai (AU); Jian Zhang, Enfield (AU)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/407,188

(22) Filed: Sep. 28, 1999

(51) Int. Cl.[7] .................................................. G06K 9/32
(52) U.S. Cl. ......................... 382/284; 382/305; 382/233
(58) Field of Search ................................. 382/284, 115, 382/232, 233, 177, 178, 305, 100, 235, 243, 244, 248, 249, 250; 358/400, 540, 450; 345/629; 707/1, 100, 200

(56) References Cited

U.S. PATENT DOCUMENTS

| | | | | |
|---|---|---|---|---|
| 4,674,040 A | * | 6/1987 | Baker et al. | 707/200 |
| 5,103,490 A | * | 4/1992 | McMillin | 382/284 |
| 5,838,837 A | * | 11/1998 | Hirosawa et al. | 382/284 |
| 5,859,920 A | * | 1/1999 | Daly et al. | 382/115 |
| 6,002,492 A | * | 12/1999 | Kamon et al. | 358/450 |
| 6,002,798 A | * | 12/1999 | Palmer et al. | 382/176 |
| 6,008,745 A | * | 12/1999 | Zandi et al. | 341/67 |
| 6,330,073 B1 | * | 12/2001 | Sciatto | 358/1.18 |

OTHER PUBLICATIONS

"Chinese Document Layout Analysis Based on Adaptive Split–And–Merge and Qualitative Spatial Reasoning" by Jiming Liu, Yuan Y. Tang & Ching Y. Suen published in "Pattern Recognition", vol. 30, No. 8, pp. 1265–1278, 1997.

* cited by examiner

Primary Examiner—Bhavesh Mehta
Assistant Examiner—Kanji Patel
(74) Attorney, Agent, or Firm—Daniel K. Nichols (57) ABSTRACT

Two document images which have been compressed using the JBIG-2 standard for facsimile applications so as to include a plurality of index numbers, one or more positions in each image associated with the index numbers, and a group symbol for each index number can be merged to form a final composite image. Firstly, two virtual indexed images are formed by patterns of the index numbers at their associated positions in the document images. The patterns of index numbers in the two virtual indexed images are then compared (22) to determine whether there is correlation between the patterns of index numbers in at least parts of the two virtual indexed images. The two virtual indexed images are then merged (25), when there is a sufficient correlation, such that the parts that correlate overlap each other to provide a merged virtual indexed image, and then the index numbers in the merged virtual indexed image are replaced (7) by the corresponding group symbol to provide the final composite image.

14 Claims, 4 Drawing Sheets

FIG. 1

PRIOR ART

FIG. 2

PRIOR ART

| index | symbol | index | symbol | index | symbol | index | symbol | Index | symbol |
|---|---|---|---|---|---|---|---|---|---|
| 1 | T | 20 | g | 37 | 0 | 26 | r | 108 | * |
| 12 | h | 32 | 1 | 11 | b | 6 | u | 109 | ( |
| 13 | i | 99 | 2 | 15 | c | 0 | v | 110 | ) |
| 18 | s | 88 | 3 | 17 | d | 101 | ! | 111 | _ |
| 53 | a | 77 | 4 | 19 | j | 102 | @ | 112 | + |
| 7 | t | 66 | 5 | 2 | k | 103 | # | 8 | e |
| 63 | e | 55 | 6 | 4 | l | 104 | $ | | |
| 33 | o | 3 | 7 | 5 | m | 105 | % | | |
| 47 | f | 10 | 8 | 79 | p | 106 | ^ | | |
| 54 | n | 12 | 9 | 97 | q | 107 | & | | |

This is a test of nothing
11112345678901234566
abcdefghijklmnopqrstuv
!@#$%^&*()_+!@

METHOD AND APPARATUS FOR MERGING IMAGES

FIELD OF THE INVENTION

This invention relates to a method and apparatus for merging images, especially images of documents which have been acquired as separate images.

BACKGROUND OF THE INVENTION

When a document image is captured by a digital camera or a portable scanner, it is often the case that only part of a page of the document is included in each image. This is because the resolution of the camera or scanner is often not high enough to produce a readable document with a single image. In order to increase resolution of the captured text image, a single page of the document often needs to be captured in several images. Therefore, to be able to convert a text image in order to perform optical character recognition on the complete text so as to, for example, convert the text into a word processing application, it is necessary to merge these images back into one single image after capturing. Such merging generally requires the use of image processing techniques, including filtering, recognition, matching and so forth, which can be complicated and lengthy.

Traditional image processing techniques work at a pixel level for image merging. That is, a correlation between pixels is determined to find the best match between two images. While this method works well for natural images, it fails to deal efficiently with text images which contain only black text and white (or light) background.

For many document images, only black-white text objects are available. Such bi-level images contain little useful information at pixel level for correlation analysis because the correlation values can only be either 1 (for same colour pixels) or 0 (between different colour pixels). In addition, the distribution of the black pixel in an image is so non-regular that there are no obvious patterns that can be used for reliable correlation analysis. As a result, using correlation analysis technique at pixel level, as done for natural image merging, often fails to merge document image properly. In addition, correlation analysis using pixels is very time consuming due to the fact that many pixels have to be used for computation of correlation values over and over again.

Furthermore, although, the portable equipment, such as the camera or scanner compresses the acquired image, for example using the JPEG technique, in order to reduce the amount of memory required to store the image, the digital processing techniques necessary to merge two or more such images still require relatively high processing capability, which is often not available in portable equipment.

BRIEF SUMMARY OF THE INVENTION

The present invention therefore seeks to provide an efficient solution for implementing image merging which overcomes, or at least reduces the above-mentioned problems of the prior art.

Accordingly, in a first aspect, the invention provides a method of merging images comprising the steps of providing a compressed representation of at least two images, each compressed representation including a plurality of index numbers, one or more positions in each image associated with the index numbers, and a group symbol for each index number, forming an indexed image for each image, each indexed image comprising a pattern of index numbers at their associated positions in the image, comparing the patterns of index numbers in a first indexed image with the patterns of index numbers in a second indexed image to determine whether there is correlation between the patterns of index numbers in at least parts of the first and second indexed images, merging the first and second indexed images when there is a sufficient correlation, such that the parts that correlate overlap each other to provide a merged indexed image, and replacing the index numbers in the merged indexed image by the corresponding group symbol to provide a merged image.

In a preferred embodiment, the compressed representation of at least two images is formed by the steps of, for each image, acquiring the image, segmenting the image into a plurality of symbols, each having a position in the image associated therewith, comparing the plurality of symbols to find groups of symbols that are substantially identical and assigning an index number to each such group, storing the symbol for each group, associating the assigned index number with the respective position in the image for each stored symbol, and utilising the assigned index number, the associated position, and the stored symbol to provide the compressed representation of the image.

Preferably, the step of storing the symbol involves storing a bit map of the symbol.

In one embodiment, the step of comparing patterns of index numbers in a first indexed image with the patterns of index numbers in a second indexed image comprises the steps of choosing a first index number at a first position in the first indexed image and determining the positions of at least some substantially identical index numbers in the second indexed image, choosing a subsequent index number at another position in the first indexed image, and determining which of the previously determined index numbers in the second indexed image has a substantially identical subsequent index number at a position corresponding to the position of the subsequent index number in the first indexed image, and repeating the previous step until a sufficient correlation between index numbers in the second indexed image and in the first indexed image is obtained to provide the overlapping parts of the first and second indexed images.

Preferably, the step of repeating takes place until only one subsequent index number in the second indexed image is determined to be in a position corresponding to the position of the subsequent index number in the first indexed image. The images to be merged preferably include at least some text.

The method preferably further comprises, between the steps of providing a compressed representation of at least two images and forming an indexed image for each image, the steps of comparing the plurality of symbols a second time to find second groups of symbols that are at least similar and assigning a second index number to each such second group, whereby there are fewer second groups than said group, storing the symbol for each second group, associating the assigned second index number with the respective position in the image for each stored symbol, storing the assigned second index number and the associated position at least temporarily, and utilising the assigned second index number and the associated position in the step of forming an indexed image for each image, each indexed image comprising a pattern of said second index numbers at their associated positions.

The indexed images are preferably virtual images.

In a preferred embodiment, the method further comprises, between the steps of providing a compressed representation of at least two images and forming an indexed image for each image, the step of correcting the positions in each image associated with the index numbers to substantially compensate for skew in the image.

Preferably, the step of comparing the patterns of index numbers in a first indexed image with the patterns of index numbers in a second indexed image to determine whether there is correlation between the patterns of index numbers in at least parts of the first and second indexed images comprises the steps of ordering the index numbers of the first indexed image according to their associated positions in the first image, ordering the index numbers of the second indexed image according to their associated positions in the second image, aligning the first and second indexed images in a first direction, and correlating the patterns of index numbers in the first and second indexed images in a second direction, substantially perpendicular to the first direction, to find a position at which the correlation between the patterns of index numbers is at a maximum.

The step of aligning the first and second indexed images in a first direction preferably comprises moving one of the first or second indexed images relative to the other of the two images in the first direction and determining the relative position at which there is a maximum correlation between them.

The step of correlating the patterns of index numbers in the first and second indexed images preferably comprises the steps of determining the correlation between the index numbers in the first and second indexed images at a first relative position, moving one of the first or second indexed images relative to the other of the two images in the second direction by one index number to a next relative position, determining the correlation between the index numbers in the first and second indexed images at the next relative position, repeating the moving and determining steps for all possible relative positions, and determining at which relative position there is a maximum correlation between the index numbers in the first and second indexed images.

According to a second aspect, the invention provides a system for merging images comprising an input terminal for receiving a first set of data regarding a first image and a second set of data regarding a second image, each set of data including a plurality of index numbers and positional data associated with each index number indicating at least one location of a symbol associated with that index number in the image, a storage device coupled to the input for storing first and second virtual images made up of patterns of index numbers positioned at the location(s) of their associated symbols, a comparison module coupled to the storage device for comparing the patterns of index numbers in the first virtual image with the patterns of index numbers in the second virtual image to determine whether there is correlation between the patterns of index numbers in at least parts of the first and second virtual images, a merging module coupled to the comparison module for merging the first and second virtual images when there is a sufficient correlation, such that the parts that correlate overlap each other to provide a merged virtual image, and an output terminal coupled to the merging module for providing amended first and second sets of data where the positional data associated with each index number in the first and second sets of data has been amended for at least those index numbers in the overlapping parts of the first and second virtual images.

In a preferred embodiment, the system further comprises a document decompression system having a decompression module, a database coupled to the decompression module for storing the first set of data regarding the first image and the second set of data regarding the second image, an output coupled to the input terminal and an input coupled to the output terminal for receiving the amended first and second sets of data, and a document image reconstruction module having an input coupled to the database for receiving the amended first and second sets of data and for reconstructing a merged image therefrom.

BRIEF DESCRIPTION OF THE DRAWINGS

One embodiment of the invention will now be more fully described, by way of example, with reference to the drawings, of which.

DETAILED DESCRIPTION OF THE DRAWINGS

Figure 1:
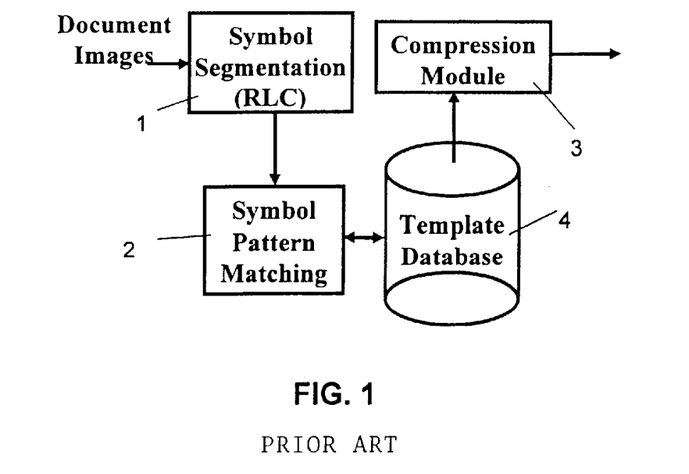
FIG. 1 shows a schematic diagram of a known image compression system.

Thus, as is known, for document image compression, pattern matching techniques are employed to achieve higher compression ratios. Pattern matching techniques work well with bi-level text images and are used in the JBIG-2 standard for facsimile applications, as published by the Joint Bi-Level Image Experts Group of the International Standards Organisation. FIG. 1 shows the general system structure for document image compression. As shown in FIG. 1, an input document image is firstly segmented by a symbol segmenter 1 that produces a bit map of individual symbols. The segmenter 1 can be implemented in a number of different ways. Run Length Coding (RLC) is a known efficient technique for symbol segmentation and will not be further described here. The resulting symbols from the symbol segmenter 1 are then passed to a symbol pattern matching device 2, where they are each compared with templates stored in a template database 4. The symbol pattern matching module 2 can be implemented using different techniques. A template is a bit map of a known symbol. If a template is found to match a symbol from the symbol segmenter 1, the index and coordinate of the symbol corresponding to that template are stored in the database. If the symbol does not match any of the templates in the database, a new template is created in the template database 4 by the symbol pattern matching module 2, and, again, the index and coordinates of the symbol corresponding to that new template are stored in the database 4. Once all the symbols resulting from the symbol segmentation process have passed though the symbol pattern matching module 2, the data from the template database 4 is fed into a compression module 3 where the template bit maps, indices and coordinates are compressed using lossless compression techniques, such as arithmetic coding. This produces the known compressed image, such as that used in the JBIG-2 standard.

Figure 2:
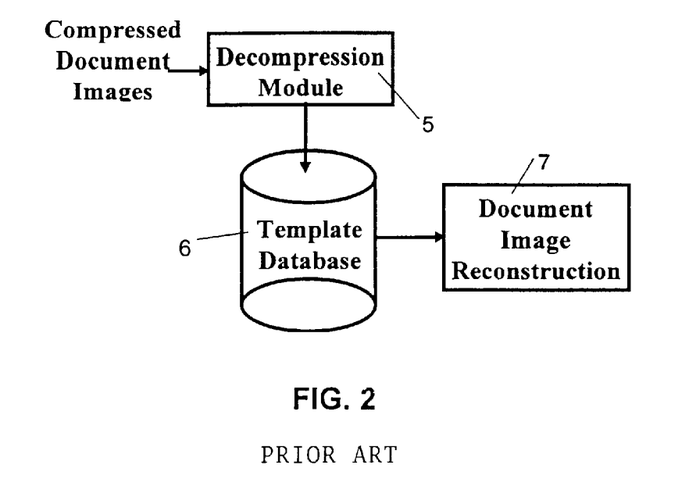
FIG. 2 shows a schematic diagram of a known image decompression system.

As shown in FIG. 2, a compressed document image is decompressed by a decompression module 5 to produce data including the templates and their corresponding indices and coordinates in the document. This data is stored in a template database 6. By using the data in the database, a document image reconstruction module 7 is able to reconstruct a document image, by putting the bit maps of each indexed template back into an image frame according to their coordinates.

Figure 3:
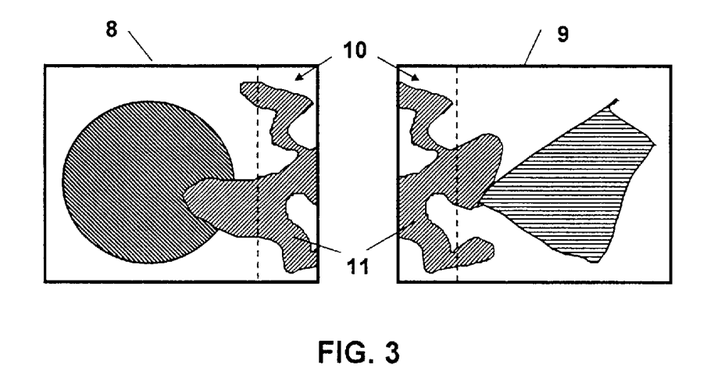
FIG. 3 shows two documents having images thereon with an overlapping region which are to be merged.

In order to be able to merge two images into one, part of both of the two images must contain the same information, as shown in FIG. 3. As can be seen in FIG. 3, a first image 8 and a second image 9 contain an identical portion 10 of the same image object 11. It will be appreciated that the portion 10 need not be completely identical in all cases, but will be sufficiently similar for the differences to be negligible. Therefore, when the second image 9 is shifted toward the first document 10, the pixels in the overlapping area can be used to perform correlation analysis. The correlation value can be calculated in different ways and should achieve maximum when the overlapped area in the second image 9 is laid over the same area of the first image 8. For natural images, the correlation value is computed using pixel values and good results can be achieved using such technique. It will be appreciated that, depending on how the correlation analysis is carried out, better or worse merging results will be achieved, especially if the overlapping parts of the images are not identical, as when, for example, two pictures are taken, one after the other of a landscape where some objects, such as, clouds, will have moved slightly between one picture and the next.

Figure 4:
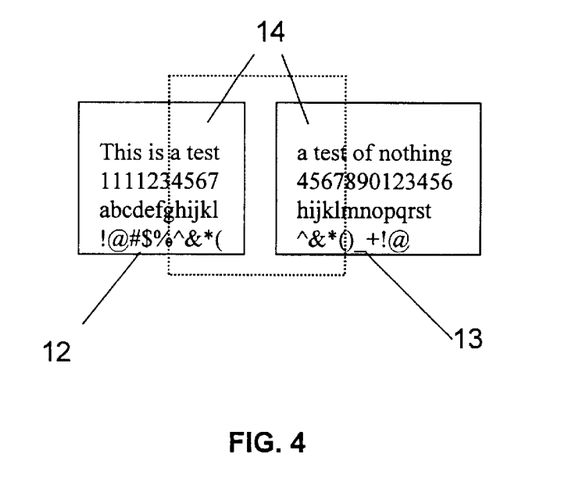
FIG. 4 shows two documents having text thereon with an overlapping region which are to be merged.

When, however, the documents to be merged have text, or other substantially bi-level images thereon, for example as shown in FIG. 4, a template database, such as described above may well be available for the documents, if they are passing through a document image decompression system. In such a case, as described above, the template database will have stored therein the indices and coordinates of each symbol which is to be used in the decompression process. Accordingly, document image merging can be achieved by using a correlation analysis at the symbol level instead of at a pixel level.

As mentioned above, each symbol in the document image is given an index number corresponding to a particular template stored in the template database and a pair of coordinates. Using the index number, the template that is the same as the symbol is found from the template database 6 in FIG. 2. Therefore, the document image reconstruction module 7 places the template symbol (bit map) in an image frame at a location given by its associated coordinate whereby a document image is reconstructed.

Figure 5:
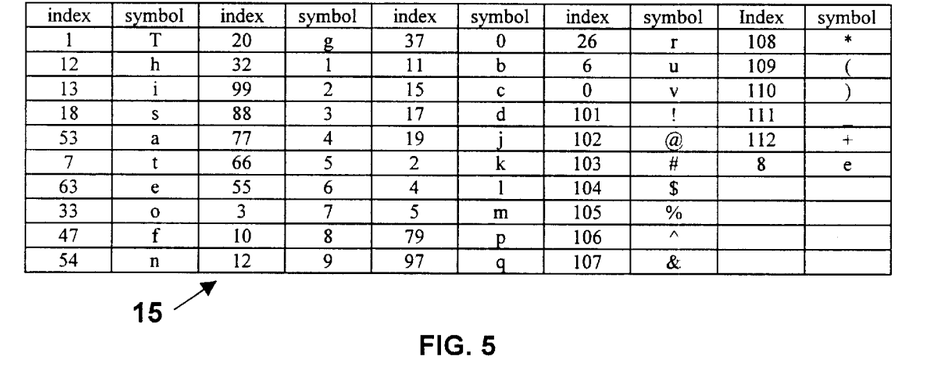
FIG. 5 shows an example of an index look-up table for the text shown in FIG. 4.

In the present embodiment, however, instead of the template bitmap, the index number of each symbol is placed in an image frame at a position according to its coordinates. As such, an artificial and virtual image composed of index numbers is created. To show how this can be done, we refer now to FIGS. 4, 5 and 6.

Figure 6:
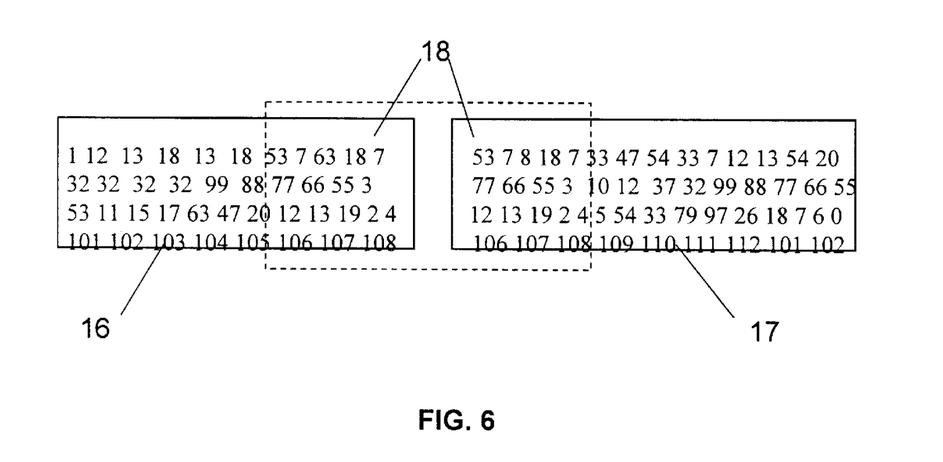
FIG. 6 shows the two documents of FIG. 4 with the text represented by index numbers from the table of FIG. 5.

FIG. 4 shows two images 12 and 13 of a single document page. An overlapping area 14 in both images can be used to merge the images. During the compression process, these images have been segmented into symbols that are stored in the template database after symbol pattern matching. In the decompression process, the same database is generated in which each symbol is associated with an index number and coordinates. For the example shown in FIG. 4, the index number of each symbol is provided in a look-up table 15 shown in FIG. 5. For example, the index number of the symbol 1aî is ì53î and, although this symbol is repeated several times in the image, the template of symbol ìa^^need only be stored once, with the corresponding index number being associated with coordinates of each location where the symbol is located. Thus, by replacing the symbols in FIG. 4 with their index numbers from FIG. 5 the result shown in FIG. 6 is arrived at. As can be seen, the resultant virtual images 16 and 17 in the index domain, have the same overlapping area 18 as the images 12 and 13 in FIG. 4. However, correlation analysis in this index domain is more reliable and also less computationally complex than in the symbol domain because only very limited numbers of possible indices are used in the analysis. Thus, the two ìimages^^in the index domain can be easily merged and then remapped to the symbol domain to provide the finished merged text.

Figure 7:
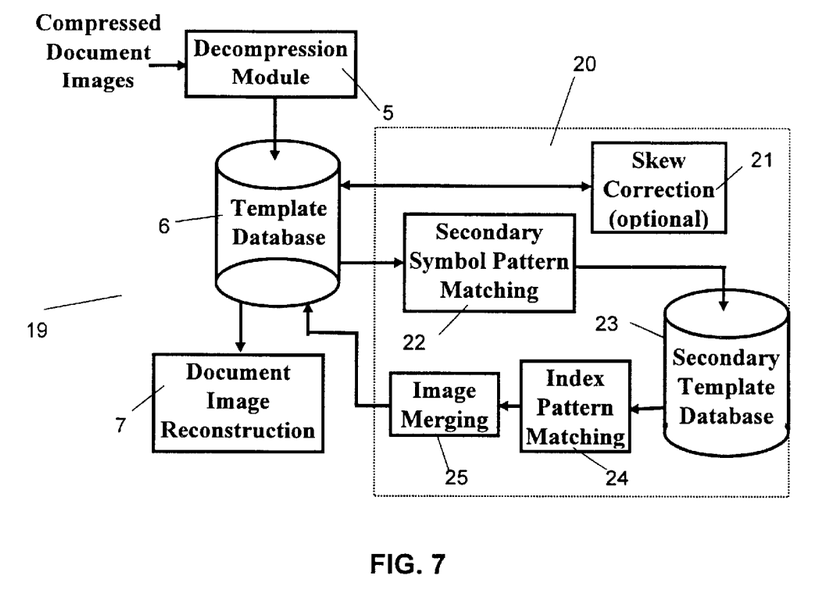
FIG. 7 shows a schematic diagram of a document merging and decompression system.

FIG. 7 illustrates how the document image merging scheme described above can be integrated with the document image decompression system of FIG. 2. As can be seen, the combined decompression and merging system 19 includes the decompression module 5, the template database 6 and the document image reconstructing device 7 of the decompression system, but now also includes a document image merging system 20. This document image merging system 20 includes a skew correction module 21, a secondary symbol pattern matching module 22, a secondary template database 23, an index pattern matching module 24 and an image merging module 25.

Figure 8:
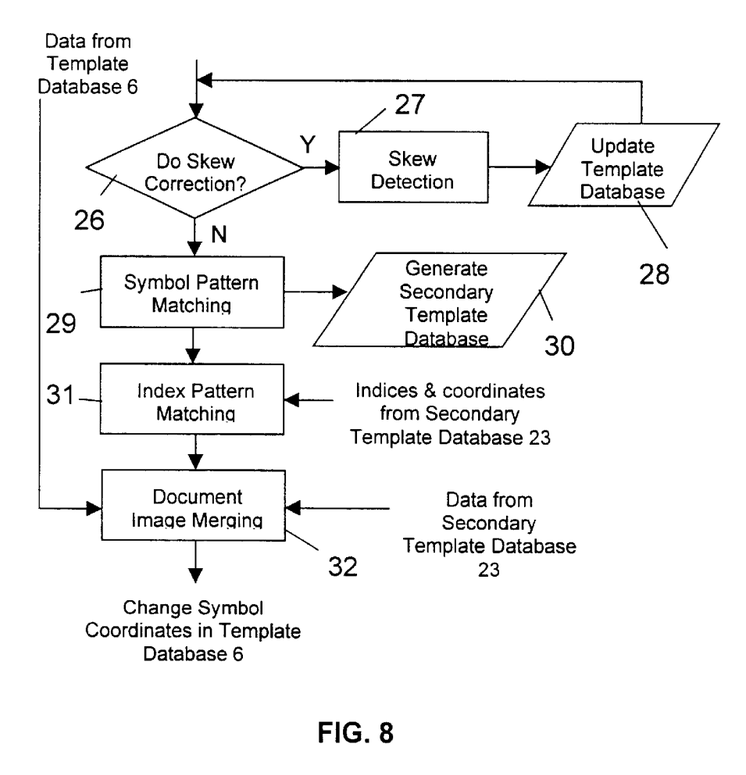
FIG. 8 shows a flow chart of the operation of the system of FIG. 7.

Referring now also to FIG. 8, the operation of the document image merging system 20 will now be more fully described. Firstly, an optional skew correction can be carried out by the skew correction module 21. Skew correction is used to remove the geometrical distortions introduced during the image capturing process. This includes lens distortion and human error. A major problem for capturing document images using a digital camera is the alignment of the camera viewfinder and the text lines. Any angle between the two will make the merging of document images difficult. For some situations, however, skew correction may not be necessary. For example, if the captured images do not have geographical distortion or if skew correction is carried out before the template database 6 is generated. Therefore, the first step 26 is determine whether skew detection is to be performed or not. If the result of the determination is that skew correction is to be performed, the skew correction module 21 determines the skew angle, as indicated at step 27. Skew correction is then carried out to update the template database 6, as indicated by step 28, using the skew angle from the skew detection step 27 to modify the template bit map and associated coordinates.

In ideal cases where document images are well produced without noise, the symbol indices can be used directly for effective document image merging. However, when the images are captured with a high level of distortion, the correlation analysis result obtained by directly using the symbol indices in template database 6 is not very reliable. This is because mismatching between different symbols is totally prohibited in order to ensure the quality of the reconstructed image. To avoid mismatching, it is inevitable that some symbols which are the same will be regarded as different symbols because of distortion. When there are too many such cases, particularly in the overlapping areas, merging of the images becomes difficult. Obviously, when the same symbols in two images are regarded as different they will be assigned different indices and their correlation value will be low. In the worst case, when there are only a few identical indices that appear at identical locations in the overlapping areas of the two images, merging will not be achieved.

Therefore, to achieve reliable merging, identical symbols at identical coordinates in the overlapping areas of the two images must be found to be identical, i.e., to have the same index numbers. This can be achieved by decreasing the threshold values for symbol pattern matching when the symbols are first produced, i.e. by decreasing the correlation value required to produce the same symbol. However, it is not desirable to introduce mismatching for reconstructed images. For this reason the secondary template database 23 is introduced. As shown in FIG. 7, the secondary symbol pattern matching module 22 is coupled to the template database 6 to compare the template symbols in template database 6 using lower correlation thresholds to perform symbol pattern matching, as shown in step 29 of FIG. 8. In other words, the threshold values used by the secondary symbol pattern matching module 22 are lower that those used in the symbol pattern matching module 2 of FIG. 1. The result is that a greater number of identical symbols are matched under the new matching conditions. The matching results from the symbol pattern matching step 29 are used to generate (step 30 in FIG. 8) the secondary template database 23 in which a look up table is also created to map the template symbols in the two databases. It should be noted that the number of template symbols in the secondary template database 23 is therefore much smaller than that in template database 6.

Next, the template symbols are obtained from the secondary template database 23, if one has been generated, or from the template database 6 of the decompression system (or other systems),and image merging can be performed by exploring the correlation between the symbols in the two images. By using the indices and coordinates of the symbols, artificial (virtual) images can be created, as shown in FIG. 6. The images 16 and 17 can be thought of as the text replaced by properly positioned corresponding index numbers, or as a pattern made up by numbers. When the numbers are replaced by bit maps, a document image is reconstructed. Clearly, correlation exists between the two images in terms of the index numbers and the best match can be found using an appropriate searching method.

In general, the indices obtained from the symbol matching technique are stored in the secondary template database 23 or the template database 6 in random order. In order to compute the correlation between index numbers, the index numbers must be formed into the virtual images forming patterns of index numbers. One method of producing the virtual images in the index number domain is to reorder the template database. This can be done by firstly sorting the index numbers according to the top left corner of each associated symbol, i.e., according to the coordinates of each symbol. However, because of distortions, it is difficult to separate each symbol into a particular line. Therefore, a statistical calculation is applied based on those symbols that are close to each other (namely, the coordinates of top left corner of the symbol). This is done by comparing the height information of each symbol with the average height which is statistically collected using the height of symbols having a similar vertical position (coordinate). Once this is done, each symbol will have been categorised into different lines.

Once the reordering of the indices is completed, all the symbols with similar vertical positions are sorted according to their horizontal positions based on their coordinates. In this way, all index numbers are placed in the database in the order of the original positions of their associated symbols.

Various pattern matching techniques can be used by the index pattern matching module 24 to find the best match vertically and horizontally, as indicated by step 31 in FIG. 8. For example, one can start from one symbol, say with index number 77, in the second image 17 in FIG. 6 and then search in the first image to find all instances of the same number 77. Then, each one can be checked to see whether it is followed by index number 66 (as in the second image 17). If several instances of the numbers 77 followed by 66 are found, then a further check is made to see whether they are followed by 55, and so on. Of course, it is also possible to compare them by looking at other neighboring numbers from other text lines as well. Eventually, a best match is found and image merging is carried out at step 32 in FIG. 8 based on this best match.

Another way of pattern matching is to align the images vertically first using the lines of index numbers, before merging them horizontally. The alignment of the two images is achieved by shifting one image up and down by one line and left and right by one symbol each time and at the same time to measure the correlation values of the two images across the overlapping areas for each shift. If the virtual image is regarded as a pattern of index numbers, the vertical alignment is a process of pattern matching. The result is that a maximum value of pattern matching is found at a particular shift and the number of shifts vertically from the original position to the matched position is the offset in vertical direction between the two images. This matched position also provides the useful information for horizontal direction matching of each line, namely, a reference distance which is the distance from the left side of the first image to the left side of the overlapping area after the best match has been found.

It should be noticed that some visually similar patterns in document images may be classified as different symbols, even after the secondary symbol pattern matching, due to distortion and noise. In other cases, in the overlapping areas, some patterns may be broken or joined together in one image but not in the other. All these problems can cause difficulty in line alignment and in determining the exact extent of the overlapping area for each pair of aligned lines. Therefore, in this embodiment, the line alignment technique is based on the following three assumptions:

1. When two images are merged properly, the total number of matched index numbers should reach a maximum at one unique position;
2 When two images are merged properly, the total number of matched lines should reach a maximum at one unique position; and
3. When two images are merged properly, the unique positions in assumptions 1 and 2 are the same.

Accordingly, the total number of matched lines and the total number of matched index numbers are determined for each vertical shift. The vertical shift with the highest numbers of matched lines and matched index numbers is then chosen to provide the correct vertical alignment. If the shift with the highest number of matched lines is not the same as the shift with the highest number of matched index numbers, the position with the highest number of matched lines is chosen as the best match.

The advantages of doing pattern matching at symbol level are high reliability and low complexity. As a matter of fact, the symbol pattern matching modules 2 and 22 can be regarded as filters that remove the noise at pixel level, by replacing the symbol, a group of pixels, with an index number. This allows more reliable pattern matching and hence reliable merging. In addition, the correlation analysis at symbol level (index domain) requires much less computation because the number of indices used for correlation analysis is very limited, whereas correlation analysis at pixel level is very time consuming.

Once the best match is found, a decision needs to be made where the two images should be merged. Two images can be merged together anywhere in the overlapping areas. A good merging scheme should ensure smooth transition from one image to the other. In this regard, pattern matching at symbol level naturally avoids cutting the image through the symbols by performing line-by-line (text line) merging because the essential unit for merging is the symbol, not the pixel.

One way of determining the horizontal alignment involves determining the exact number of repeated index numbers between each pair of corresponding lines in the two virtual images. Again, a difficulty in finding this overlap distance is that there may not be a sufficient number of identical indices in the two images due to distortion and noise in the images. Accordingly, a starting point from which each pair of lines can be merged needs to be found. Again a statistical distribution model is used to determine the horizontal offset based on the following two assumptions:

1. The merging point of both images is at or close to a reference line; and
2. When the two images are merged at this reference line, most lines in the images will be merged properly.

This reference distance, which was found during the previous vertical line matching, is then used to compare with each offset distance derived from an individual pair of aligned lines. This comparison gives rise to two possible results:

1. If the absolute difference between the actual offset distance and the reference distance is greater than a first threshold $T_1$ and less than the second threshold $T_2$ ($T_2 > T_1$) or there is no actual offset distance for the particular pair of aligned lines, the reference distance will be used as the best offset distance. Otherwise, the actual distance is used.
2. If the difference between the actual offset distance and the reference distance is greater than the second threshold $T_2$, the line matching is restarted in a smaller searching range centralized at the reference distance position and uses the maximum correlation value to determine the best match position.

These processes are repeated for all the pairs of aligned lines until the best offset distance is determined.

Using the best offset distance, the document image merging module 25 performs document image merging by modifying the coordinates of the symbols in the template database 6. Firstly, the part of the first image beyond the offset distance is deleted. Then the coordinates of the symbols in the second image are offset based on the coordinates of the merging points. Because the template symbols in the template database 6 and the secondary template database 23 are not the same, the look up table created by step 30 when the secondary template database 23 is created is used to map the symbols between the two databases.

Figure 9:
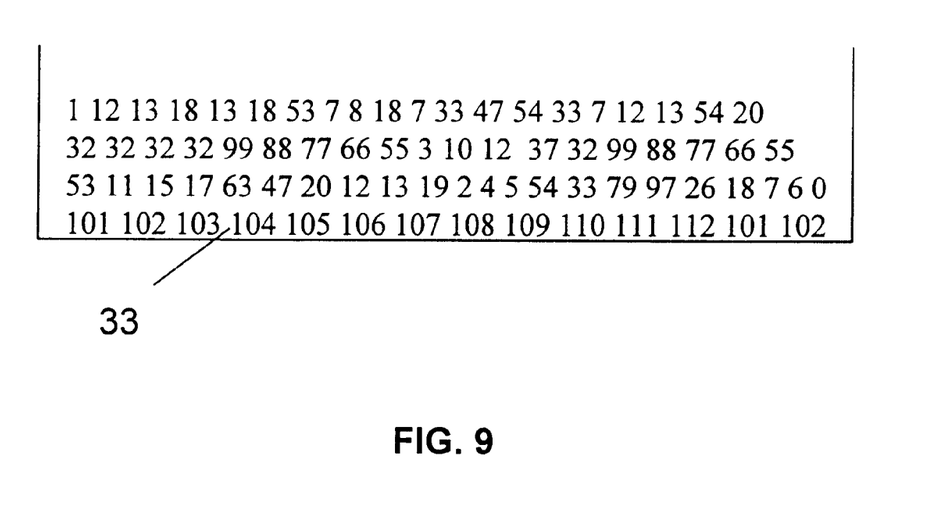
FIG. 9 shows a single document having the index numbers from FIG. 6 merged.
Figure 10:
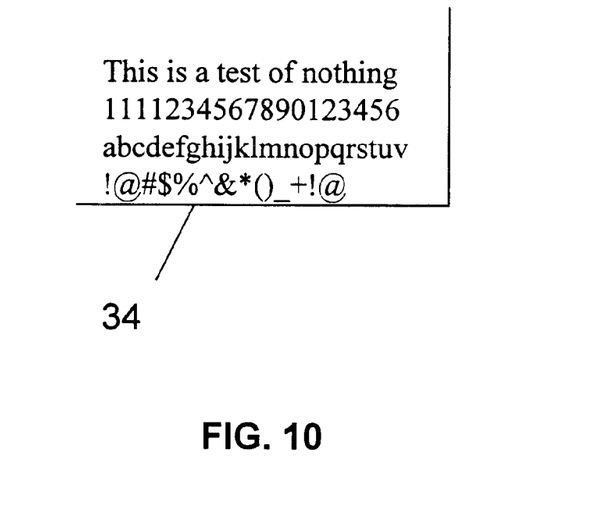
FIG. 10 shows a single document having the text from FIG. 4 merged.

After merging, the index domain image 33 shown in FIG. 9 is produced. This is only a virtual image that is implied in the coordinates and indices of each symbol. The corresponding document image 34 is shown in FIG. 10. The merged document image 34 is produced by the document image reconstruction module 7 using the updated data from the template database 6. It is this image that needs to be physically generated.

It will be apparent from FIG. 7 that both the input to the document image merging system 20 and the output from the document image merging system 20 are coupled only to the template database 6. Consequently, as long as the template database 6 is available, the document image merging system 20 can operate. Therefore, although in the present embodiment, the document image merging system 20 has been described as integrated with the document image decompression system, the document image merging system 20 can merge document images by working with any other systems (applications) that produce similar template databases. A template database is a database that contains symbol templates as well as their indices and coordinates organized in some way.

Thus, the present embodiment of this invention has introduced a new method for document image merging, which is essentially different from the traditional methods. Traditional methods work at pixel level for correlation analysis. That is, the correlation between pixels is explored to find the best match between two images. While this method works well for natural images, it fails to deal with document images which contain only black text and white background (or vice versa). On the other hand, using correlation analysis at symbol level, i.e., in the index domain, can effectively explore the inter-symbol correlation that cannot be discovered by analysis at pixel level. Inter-pixel correlation is very weak in black and white images. Also, due to the poor quality of the document images resulting from noise, pixel level correlation analysis results are very unreliable and therefore produce low merging rates. However, when document images are mapped from the pixel domain into the index domain, noise in the original images is effectively removed, which increases the merging reliability. As described above, the present embodiment can be easily integrated with a pattern matching technique based document image decompression system. It can be attached or removed from the system in a very convenient way. When it is integrated with the decompression system, the technique can utilize the data in the template database that is provided for free. This makes the technique more attractive, since it reduces the overall expense of including the merging feature.

It will be appreciated that although only one particular embodiment of the invention has been described in detail, various modifications and improvements can be made by a person skilled in the art without departing from the scope of the present invention.

What is claimed is:

1. A method of merging images comprising the steps of:
providing a compressed representation of at least two images, each compressed representation including a plurality of index numbers, one or more positions in each image associated with the index numbers, and a group symbol for each index number;
forming an indexed image for each image, each indexed image comprising a pattern of index numbers at their associated positions in the image;
comparing the patterns of index numbers in a first indexed image with the patterns of index numbers in a second indexed image to determine whether there is correlation between the patterns of index numbers in at least parts of the first and second indexed images;
merging the first and second indexed images when there is a sufficient correlation, such that the parts that correlate overlap each other to provide a merged indexed image; and replacing the index numbers in the merged indexed image by the corresponding group symbol to provide a merged image.

2. A method of merging images according to claim 1, wherein the compressed representation of at least two images is formed by the steps of, for each image:

acquiring the image;

segmenting the image into a plurality of symbols, each having a position in the image associated therewith;

comparing the plurality of symbols to find groups of symbols that are substantially identical and assigning an index number to each such group;

storing the symbol for each group;

associating the assigned index number with the respective position in the image for each stored symbol; and utilising the assigned index number, the associated position, and the stored symbol to provide the compressed representation of the image.

3. A method of merging images according to claim 2, wherein the step of storing the symbol involves storing a bit map of the symbol.

4. A method of merging images according to claim 1, wherein the step of comparing patterns of index numbers in a first indexed image with the patterns of index numbers in a second indexed image comprises the steps of:

choosing a first index number at a first position in the first indexed image and determining the positions of at least some substantially identical index numbers in the second indexed image;

choosing a subsequent index number at another position in the first indexed image, and determining which of the previously determined index numbers in the second indexed image has a substantially identical subsequent index number at a position corresponding to the position of the subsequent index number in the first indexed image; and repeating the previous step until a sufficient correlation between index numbers in the second indexed image and in the first indexed image is obtained to provide the overlapping parts of the first and second indexed images.

5. A method of merging images according to claim 4, wherein the step of repeating takes place until only one subsequent index number in the second indexed image is determined to be in a position corresponding to the position of the subsequent index number in the first indexed image.

6. A method of merging images according to claim 1, wherein the images to be merged include at least some text.

7. A method of merging images according to claim 2, further comprising, between the steps of providing a compressed representation of at least two images and forming an indexed image for each image, the steps of:

comparing the plurality of symbols a second time to find second groups of symbols that are at least similar and assigning a second index number to each such second group, whereby there are fewer second groups than said groups;

storing the symbol for each second group;

associating the assigned second index number with the respective position in the image for each stored symbol;

storing the assigned second index number and the associated position at least temporarily; and utilising the assigned second index number and the associated position in the step of forming an indexed image for each image, each indexed image comprising a pattern of said second index numbers at their associated positions.

8. A method of merging images according to claim 7, wherein the indexed images are virtual images.

9. A method of merging images according to claim 2, further comprising, between the steps of providing a compressed representation of at least two images and forming an indexed image for each image, the step of correcting the positions in each image associated with the index numbers to substantially compensate for skew in the image.

10. A method of merging images according to claim 1, wherein the step of comparing the patterns of index numbers in a first indexed image with the patterns of index numbers in a second indexed image to determine whether there is correlation between the patterns of index numbers in at least parts of the first and second indexed images comprises the steps of ordering the index numbers of the first indexed image according to their associated positions in the first image;

ordering the index numbers of the second indexed image according to their associated positions in the second image;

aligning the first and second indexed images in a first direction; and correlating the patterns of index numbers in the first and second indexed images in a second direction, substantially perpendicular to the first direction, to find a position at which the correlation between the patterns of index numbers is at a maximum.

11. A method of merging images according to claim 10, wherein the step of aligning the first and second indexed images in a first direction comprises moving one of the first or second indexed images relative to the other of the two images in the first direction and determining the relative position at which there is a maximum correlation between them.

12. A method of merging images according to claim 10, wherein the step of correlating the patterns of index numbers in the first and second indexed images comprises the steps of:

determining the correlation between the index numbers in the first and second indexed images at a first relative position;

moving one of the first or second indexed images relative to the other of the two images in the second direction by one index number to a next relative position;

determining the correlation between the index numbers in the first and second indexed images at the next relative position;

repeating the moving and determining steps for all possible relative positions;

determining at which relative position there is a maximum correlation between the index numbers in the first and second indexed images.

13. A system for merging images comprising:

an input terminal for receiving a first set of data regarding a first image and a second set of data regarding a second image, each set of data including a plurality of index numbers and positional data associated with each index number indicating at least one location of a symbol associated with that index number in the image;

a storage device coupled to the input for storing first and second virtual images made up of patterns of index numbers positioned at the location(s) of their associated symbols;

a comparison module coupled to the storage device for comparing the patterns of index numbers in the first virtual image with the patterns of index numbers in the second virtual image to determine whether there is correlation between the patterns of index numbers in at least parts of the first and second virtual images;

a merging module coupled to the comparison module for merging the first and second virtual images when there is a sufficient correlation, such that the parts that correlate overlap each other to provide a merged virtual image; and an output terminal coupled to the merging module for providing amended first and second sets of data where the positional data associated with each index number in the first and second sets of data has been amended for at least those index numbers in the overlapping parts of the first and second virtual images.

14. A system for merging images according to claim 13, further comprising:

a document decompression system having:
   a decompression module;
   a database coupled to the decompression module for storing the first set of data regarding the first image and the second set of data regarding the second image, an output coupled to the input terminal and an input coupled to the output terminal for receiving the amended first and second sets of data; and
   a document image reconstruction module having an input coupled to the database for receiving the amended first and second sets of data and for reconstructing a merged image therefrom.

* * * * *